(12) United States Patent
Giovanniello et al.

(10) Patent No.: US 9,334,839 B2
(45) Date of Patent: May 10, 2016

(54) PERFORMANCE ENHANCEMENT AIR FILTER

(71) Applicants: Joseph Giovanniello, Wayne, NJ (US); Fred Dombrow, Jr., Franklin Lakes, NJ (US)

(72) Inventors: Joseph Giovanniello, Wayne, NJ (US); Fred Dombrow, Jr., Franklin Lakes, NJ (US)

(73) Assignee: Joseph Ward Giovanniello, Wayne, PA (US)

( * ) Notice: Subject to any disclaimer, the term of this patent is extended or adjusted under 35 U.S.C. 154(b) by 0 days.

(21) Appl. No.: 14/193,623

(22) Filed: Feb. 28, 2014

(65) Prior Publication Data

US 2014/0248178 A1   Sep. 4, 2014

Related U.S. Application Data

(60) Provisional application No. 61/771,297, filed on Mar. 1, 2013.

(51) Int. Cl.
*B01D 46/12* (2006.01)
*F02M 35/024* (2006.01)
*B01D 46/00* (2006.01)

(52) U.S. Cl.
CPC ... *F02M 35/02458* (2013.01); *F02M 35/02483* (2013.01); *B01D 46/0028* (2013.01); *B01D 2275/40* (2013.01)

(58) Field of Classification Search
CPC .................. F02M 35/02483; B01D 46/0028
USPC ........................................................ 422/4
See application file for complete search history.

(56) References Cited

U.S. PATENT DOCUMENTS

| | | | | |
|---|---|---|---|---|
| 3,144,315 | A * | 8/1964 | Hunn | 96/421 |
| 3,380,877 | A * | 4/1968 | Smucker et al. | 428/391 |
| 6,536,418 | B1 * | 3/2003 | Ling | 123/539 |
| 2006/0242933 | A1 * | 11/2006 | Webb et al. | 55/486 |
| 2011/0293681 | A1 * | 12/2011 | Berlin et al. | 424/405 |

* cited by examiner

*Primary Examiner* — Kevin Joyner
*Assistant Examiner* — Holly Mull
(74) *Attorney, Agent, or Firm* — Coats and Bennett PLLC

(57) ABSTRACT

This disclosure relates to a method of filtering air for use in a combustion engine. A filter is utilized that comprises a treated filter fabric and a treated filter foam. The treated filter fabric and the treated filter foam include an ionizing agent, a binder comprising guar gum and ammonium sulfate, and an organo silane quarternary amine antimicrobial. Air is directed into the treated filter fabric. As air moves through the treated filter fabric, a first set of contaminants is removed. The air is then directed into the treated filter foam, which is positioned adjacent to the treated filter fabric. As the air moves through the treated filter foam, a second set of contaminants is removed.

13 Claims, 4 Drawing Sheets

PERFORMANCE ENHANCEMENT AIR FILTER

CLAIM OF PRIORITY

This application claims priority to Application No. 61/771,297, with a filing or 371(c) date of Mar. 1, 2013.

BACKGROUND

Combustion engines are central to many important functions in American communities. Such engines power everything from trucks for transporting goods, emergency vehicles such as fire trucks and ambulances, farm equipment used to plant and harvest food, and personal vehicles.

Currently, most combustion engines operate on fossil fuels, such as oil. While oil has long been used as a fuel, recent times have seen a rise in concerns relating to the use of oil and other fossil fuels. As more of the world becomes industrialized, there has arisen a need to utilize the finite supply of fossil fuels in an efficient manner. Further, concerns about carbon emissions, a typical output from combustion engines, have also increased a need to use fuels in an efficient manner.

One way in which combustion engines may be made more efficient is through the use of an air filter. An air filter cleans the air entering the engine. When air is dirty, that is, when air includes dust and pollution, particulates in the air restrict air flow into the engine and increase the amount of fuel burned by the engine. By directing air through an air filter before it reaches the engine, larger particulates in the air may be removed and prevent the engine from using more fuel than necessary.

Although traditional air filters remove some particulates, these filters are not always efficient. Dirt and pollution still find their way into the engine, leading to a decrease in fuel efficiency. Thus, there is a need for a higher efficiency air filter that increases fuel economy by further cleansing the air entering the engine.

SUMMARY

One embodiment of the methods described herein relates to a method of filtering air for use in a combustion engine. A filter filter comprising a treated filter fabric and treated filter foam is utilized. Air is directed into the treated filter fabric. The treated filter fabric is treated to include an ionizing agent, a binder comprising guar gum and ammonium sulfate, and an organo silane quarternary amine antimicrobial. The treated filter fabric removes a first set of contaminants from the air as the air passes through the treated filter fabric. The air is then directed into the adjacent treated filter foam. The treated filter foam is treated to include an ionizing agent, a binder comprising guar gum and ammonium sulfate, and an organo silane quarternary amine antimicrobial. A second set of contaminants is removed by the treated filter foam as the air passes through the treated filter foam.

In another embodiment, air is directed through a filter. The filter comprises a frame, a treated filter fabric adjacent the frame, and a treated filter foam adjacent the treated filter fabric. The treated filter foam and treated filter fabric are treated with an ionizing agent, a binder comprising guar gum and ammonium sulfate, and an organo silane quarternary amine antimicrobial. As air passes through the filter, impurities in the air are removed.

DRAWINGS

DETAILED DESCRIPTION

Figure 1:
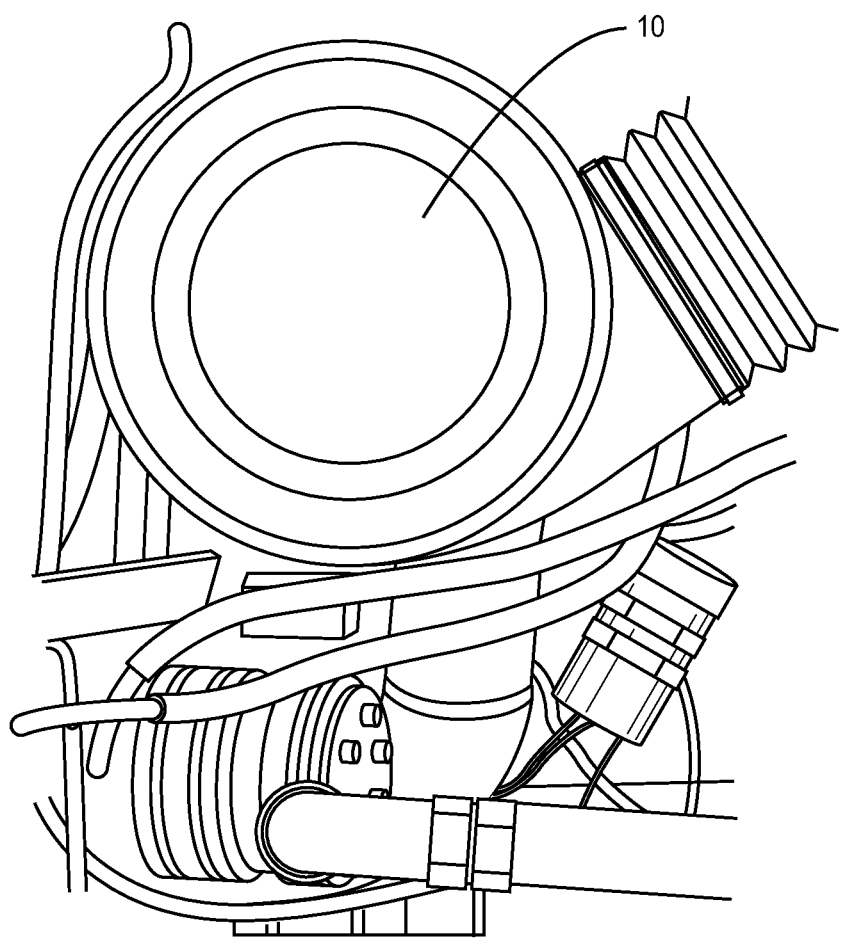
FIG. 1 is a diagram of an air filter mounted on a combustion engine for a motor vehicle.
Figure 2:
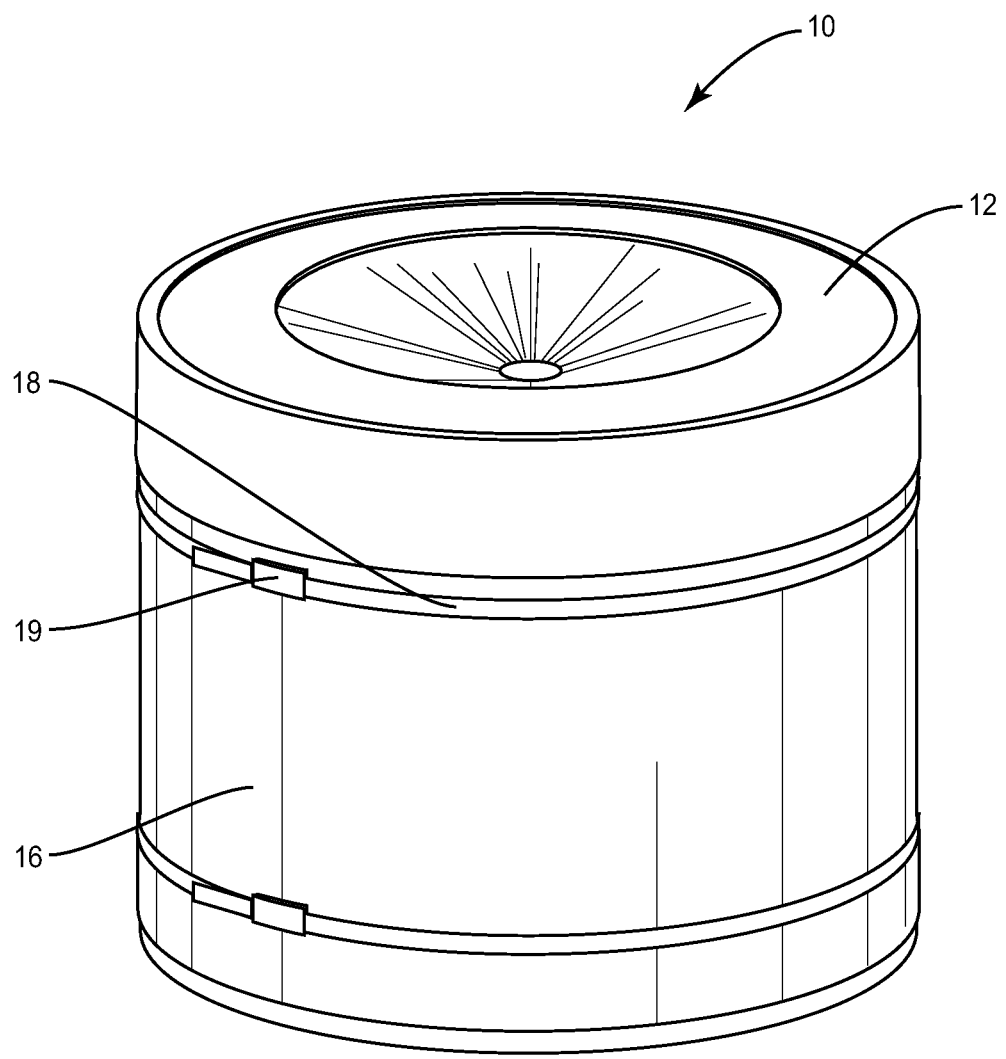
FIG. 2 is a diagram of one embodiment of an assembled air filter.
Figure 3:
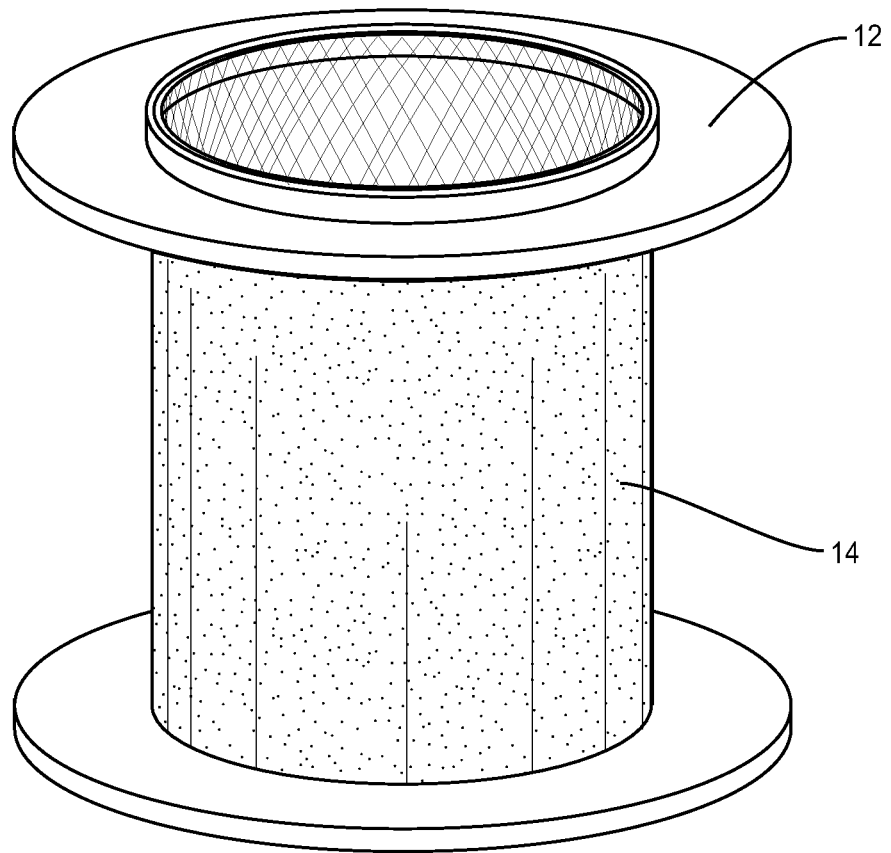
FIG. 3 is a diagram of one embodiment of an air filter frame fitted with a treated filter cloth.
Figure 4:
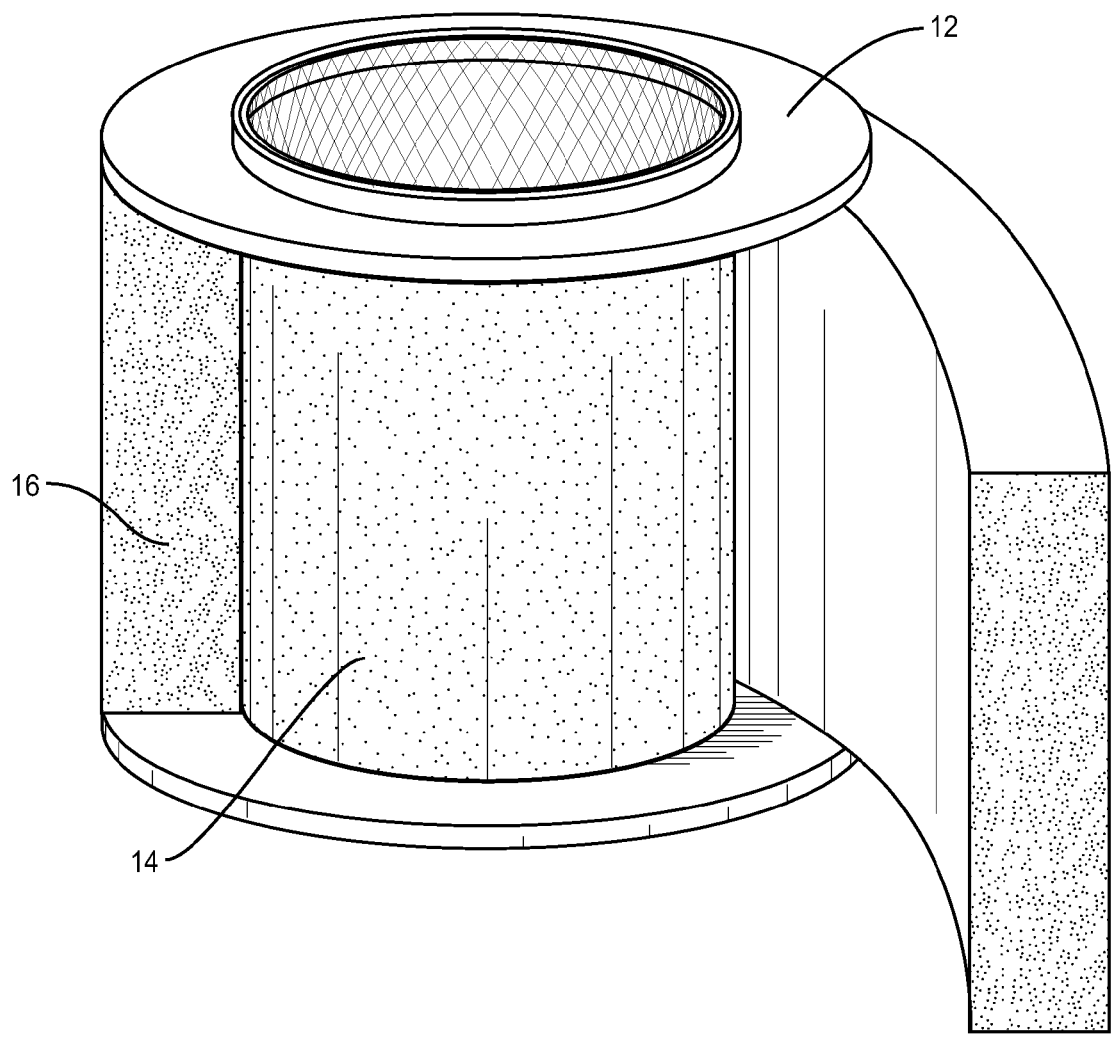
FIG. 4 is a diagram of one embodiment of an air filter frame fitted with a treated filter cloth and being fitted with a treated foam.

Referring now to the drawings, wherein like reference numbers refer to like elements in each of the several views, FIG. 1 shows one embodiment of an air filter for an internal combustion engine.

Filter (10) includes a frame (12). Frame (12) is arranged in such a way that air may pass through frame (12). In one embodiment, frame (12) is a mesh. Other embodiments of frame (12) may include, for example, bored holes, slots, or a lattice configuration. In one embodiment, frame (12) is comprised of metal. In another embodiment, frame (12) is comprised of plastic or a polymer. Frame (12) may take many shapes, such as, for example, a flat shape, a conical shape, or a cylindrical shape. In a preferred embodiment, frame (12) is cylindrical.

One of skill in the art appreciates that frame (12) may be a new frame or may be a recycled frame. Examples of frames that may be recycled and used with the methods and apparatuses described herein include Hastings stock air filter (Part No. AF608) and Baldwin stock filter (Part No. RS4636). Other exemplar frames that may be recycled include K&N filters, Spectre Performance filters, Trion filters, Aprilaire filters, and Honeywell filters for motor vehicles and other combustion engines. To recycle a previously existing filter frame, such as frame from an original equipment manufacturer filter, for use with some embodiments of filter (10), the original filter material may be simply removed. The remaining frame may then be utilized with some embodiments of the filters described herein.

Filter (10) further includes at least one fabric (14). Fabric (14) may be used to prevent fine particulates, such as, for example, sand, dust, and dirt, from passing through the filter into the engine. Fabric (14) may be a non-woven fabric, a woven fabric, or combinations thereof. Preferably, fabric (14) is a non-woven fabric. In some embodiments, the non-woven fabric is a polyolefin non-woven fabric, a polyester non-woven fabric, a rayon non-woven fabric, or a non-woven fabric with a combination of polyester, polyolefin, and/or rayon fibers. In a preferred embodiment, fabric (14) is a polyester non-woven fabric. In some embodiments, fabric (14) has an average pore size of approximately 120 microns, or preferably 95 microns, or more preferably 50 microns. In even more preferred embodiments, the average pore size is 30 microns or less. Polyester non-woven fabrics that may be utilized with the filters described herein are the air filtration media nonwoven fabrics available from Precision Custom Coatings in Totowa, N.J.

Fabric (14) may be positioned such that it covers at least a portion of frame (12). In some embodiments, fabric (14) covers those portions of frame (12) through which air will pass. In a preferred embodiment, fabric (14) is layered at least once, preferably twice, upon the portions of frame (12) through which air will pass. In some embodiments, fabric (14) is attached or otherwise secured, at least in part, to frame (12).

In selecting the type of fabric and the number of layers to be used for an embodiment of fabric (14), one of skill in the art should be mindful of the air drawn by the engine with which the particular embodiment of filter (10) is being utilized. Although various configurations may be utilized to allow for various amounts of air to enter the engine through the filter, in preferred embodiments, the type of fabric and the layers of fabric utilized in filter (10) should allow for the engine to draw approximately the same amount of air (in cubic feet per minute) as the filters provided by the original equipment manufacturer for that particular engine. One of skill in the art appreciates that many combinations of fabric type and number of layers may be utilized in embodiments for the filters described herein.

Filter (10) also includes a foam (16). Foam (16) may be comprised of polymers, such as, for example, polyurethane, polyether, and polyethylene. In a preferred embodiment, the foam is a polyethylene foam. In some embodiments, the foam is characterized as having 100 pores per square inch or less. In other embodiments, the foam is characterized as having 50 pores per square inch or less. In some embodiments, the foam is characterized as having approximately 28 pores per square inch. One of skill in the art appreciates that the optimal pores per square inch of the foam is dependent on the amount of air drawn by the engine with which the filters described herein are being utilized. An example of a foam that may be used with the filters described herein is the S28 charcoal polyethylene foam, manufactured by Foam Fabricators of Belleville, N.J. Other examples of foams that may be used are the black, green, and red, coarse or fine, UNI filter foams available from Uni Filter (www.unifilter.com).

The foam utilized in a particular embodiment of this invention should be selected based upon the engine for which the embodiment will be used. Ideally, a foam should be selected with pores per square inch that prevent passage of small particulate matter while permitting sufficient air to enter the engine. Preferably, the amount of air entering the engine through the filters described herein is approximately the same as the amount of air entering the engine if the original equipment manufacturer filter would be used therewith.

Foam (16) may be positioned such that it covers at least a portion of fabric (14) and in such a way to allow air to pass through foam (16), fabric (14), and frame (12). In some embodiments, foam (16) may be layered upon fabric (14).

Foam (16) may be secured, at least in part, to filter (10). One method of securing foam (16) may include the use of a glue. One example of a glue that may be utilized is Weldwood gel formula contact cement glue. Other glues that may be used include Uline's Heavy Duty Spray Adhesive (available at www.uline.com), 3M's Rubber and Vinyl 80 Spray Adhesive (available at solutions.3m.com), and other rubber cement type spray glues. In some embodiments, foam (16) may be secured by use of at least one strap (18). Preferably, in cylindrical frame embodiments, two straps (18) may be wrapped around foam (16) and secured via clips (19). One of skill in the art appreciates that many straps and strap securing mechanisms may be utilized, to include, for example, adjustable straps, clamping straps, and buckling straps. In some embodiments, foam (16) may also be secured to filter (10) by attachment to fabric (14), frame (12), or combinations thereof.

In preferred embodiments, fabric (14), foam (16), or a combination thereof may be treated so that they contain at least one ionizing agent and at least one antimicrobial agent. The ionizing agent and the antimicrobial agent may be bound to the fabric and/or foam via a binder. Preferably, the binder cross links the ionizing agent to the fabric and the antimicrobial agent to the fabric. An example of a binder that may be used in the filters described herein is the Nelsperse Binder, manufactured by Nelcon, Inc. of Paterson, N.J. and described in U.S. patent application Ser. No. 13/661,579. The disclosure of U.S. patent application Ser. No. 13/661,579 is incorporated herein in its entirety, including but not limited to a binder comprising guar gum, ammonium sulfate, that may further comprise urea, and/or methyl acryloid. Examples of methyl acryloids include methyl methacrylate copolymers such as, for example, Dow Chemical's Paraloid® line of methyl methacrylate copolymers.

The ionizing agent, when incorporated into the filters described herein, provides a source of unpaired electrons to interact with the mixture of air and fuel found in the combustion engine. It is hypothesized that this increases the power of the engine, as well as the engine's fuel economy. In one embodiment, the ionizing agent is tourmaline. One source of tourmaline that may be used with the filters described herein is gray ion powder sold by Ion Trading Universal Co. in Tokyo, Japan. Other examples of ionizing agents include Shanghai Huzheng Nano Technology Co., Ltd.'s negative ion powder (available at hznano.en.alibaba.com/product/516339676-213716786/Negative_ion_powderhtml); DB Chemic's Ion Powder (available at www.dbchemic.com/product/Ion.php); Root's Negative Ion Powder, Type C (available at www.root-cn.com/Negative-Ion-Powder-Type-C.html); and Ion Trading's White Tourmaline Powder (available at www.n-ion.com/e/product/tourmaline-stones-powder/tpd-1-I.html). Other examples of ionizing agents include gadolinium, phosphorus, samarium, ytterbium, and neodymium.

The antimicrobial agent prevents the growth of mold or other biological contaminants on the filter. In some embodiments, the antimicrobial agent is an organo silane quaternary amine capable of forming a spiked structure. Typically, these molecules are comprised of a silane group (R), a carbon chain ($C_xH_y$), and a quaternary amine ($NH_3$). The molecules are arranged such that the silane group is attached to one end of the carbon chain, while the amine is attached to the other end of the carbon chain, forming a molecular spike ($NH_3C_xH_yR$). One example of an organo silane quaternary amine that may be used is $NH_3C_{18}H_{36}R$. In a preferred embodiment, the antimicrobial agent is the Nelsperse Ultimate Protection antimicrobial agent, sold by Nelcon, Inc. in Paterson, N.J. In other embodiments, the organo silane quaternary amine antimicrobials that may be used is Aegis Environmental Management's Dow Corning 5700 (3-trimethoxysilyl)propyldimethyloctadecyl ammonium chloride) or Sanitized Inc.'s Requat 1977 (3-(trimethoxysilyl)-propyldidecylmethyl ammonium chloride). Still other embodiments may utilize organo silane quarternary amines antimicrobials such as $(CH_3O)_3Si(CH_2)_3N^+(CH_3)_2C_{18}H_{37}Cl^-$, $(CH_3O)_3Si(CH_2)_3N^+(C_2H_5)_3Cl^-$, $(CH_3O)_3Si(CH_2)_3N^+(CH_3)_2C_{18}H_{37}Br^-$, $(CH_3O)_3Si(CH_2)_3N^+(CH_3)_3Cl^-$, $(CH_3O)_3Si(CH_2)_3N^+(CH_3)_2CH_2C_6H_5Cl^-$, $(C_2H_5O)_3Si(CH_2)_3N^+(CH_3)_2C_{18}H_{37}Cl^-$, and $(CH_3O)_3Si(CH_2)_3N^+(CH_3)_2C_4H_9Cl^-$.

To treat fabric (14) and foam (16), a solution may be utilized. In some embodiments, the solution may be premade. In some embodiments, the solution for treating the foam may need to be prepared. One solution that may be used comprises water, at least one ionizing agent, binder, and at least one antimicrobial agent. In a preferred embodiment, the solution comprises 95% water, 2% ionizing agent, 2% binder, and 1% antimicrobial agent (by weight percent). In another embodiment, the solution comprises 97% water, 1% ionizing agent, 1% binder, and 1% antimicrobial agent (by weight percent). Another embodiment utilizes a solution with 97.5% water, 0.5% ionizing agent, 1% binder, and 1% antimicrobial agent (by weight percent).

To prepare the solution, the ionizing agent, binder, and antimicrobial are placed in water. In a preferred embodiment, a container allowing for 40 lbs of solution may be used. One of skill in the art understands, however, that smaller or larger containers may be used, depending on the amount of solution being prepared. The solution is mixed and heated to at least 100° F., and preferably to a temperature between 100° F. and 120° F. In a preferred embodiment, the solution continues to be mixed for at least five minutes after reaching a temperature of at least 100° F. One example of a mixer that may be used is the ¼ horsepower Hill Vortex mixer.

To treat the fabric and/or foam, the solution is applied to the fabric and/or foam. Application may take various forms, to include spraying and dipping. In a preferred embodiment, the fabric and/or foam may be dipped in the treatment solution to allow for total submersion and better coverage. If both the fabric and foam are being treated, they may be dipped separately or simultaneously. In a preferred embodiment, dipping occurs for five to ten minutes.

After application of the solution, the fabric and/or foam may be dried. Preferably, drying occurs at a temperature in the range of 150° F. to 250° F., or more preferably at 180° F. One of skill in the art, however, appreciates that different temperatures may be utilized depending on the type of foam or fabric being dried. To dry the fabric and/or foam, numerous drying methods may be utilized. Examples of drying methods compatible with the processes described herein include conventional laundering dryers and forced air drying ovens. The time needed for drying may be dependent on the process being utilized. For example, drying an S28 charcoal polyethylene foam from Foam Fabricators typically takes approximately thirty (30) minutes in a hot air oven at a temperature of approximately 180° F. Fabric and/or foam may be considered dry when it is dry to the touch. Once dry, the treated fabric and/or treated foam may be utilized in the filters described herein.

The filters may be used with appropriate combustion engines. Air enters the filter and passes through frame (12), into the fabric (14). Fabric (14) removes a first set of impurities. Generally, the impurities removed by fabric (14) are larger particulates. After being filtered by fabric (14), the air passes from fabric (14) into foam (16). Foam (16) removes a second set of impurities. Generally, the second set of impurities are smaller impurities that passed through fabric (14). Fabric (14) and foam (16) also serve to remove microbes from the air via the antimicrobials bound thereto. As the air passes through fabric (14) and foam (16), the ionizing agent charges the air particles to create ionized air. The ionized air is then directed into the engine, which further increases engine efficiency.

The filters described herein were tested compared to standard industry filters. For each run of the test, a fresh filter was inserted into a 2010 Chevrolet Tahoe. The vehicle was then tested pursuant to the standard US EPA Highway Fuel Economy Test cycle (HFET). To perform this test, the Chevrolet Tahoe was placed on a chassis dynamometer and driven pursuant to HFET to simulate a typical highway fuel economy cycle. For the filters provided by the original equipment manufacturer, the test returned an average fuel economy of 21.00 miles per gallon.

For the filters described herein, the test returned an average fuel economy of 21.77 miles per gallon, showing a 3.68% increase. Under the statistical checks performed pursuant to the test, the increase was deemed statistically significant.

The filters described herein are highly durable, reusable, and easy to clean and maintain. For example, to maintain the filter for optimal performance, the filter need only be cleaned via a vacuum cleaning system once every sixty days. One vacuum cleaning system that may be used to clean the filters described herein is a Shop-Vac®. By regularly cleaning the filter in this way, the filter should continue to offer high performance for at least two years. Although the present apparatus has been shown and described in considerable detail with respect to only a few/particular exemplary embodiments thereof, it should be understood by those skilled in the art that it is not intended to limit the apparatus to the embodiments since various modifications, omissions, and additions may be made to the disclosed embodiments without materially departing from the novel teachings and advantages of the apparatus, particularly in light of the foregoing teachings.

What is claimed:

1. A method of filtering air for use in a combustion engine using a filter comprising a treated filter fabric and treated filter foam, the method comprising:
    directing the air into the treated filter fabric, the treated filter fabric having an ionizing agent, an organo silane quarternary amine antimicrobial, and a binder comprising guar gum and ammonium sulfate, the binder binding the ionizing agent and the organo silane quarternary amine antimicrobial to the treated filter fabric;
    as air moves through the treated filter fabric, removing a first set of contaminants;
    directing the air from the treated filter fabric into the adjacent treated filter foam, the treated foam having an ionizing agent, an organo silane quarternary amine antimicrobial, and a binder comprising guar gum and ammonium sulfate, the binder binding the ionizing agent and the organo sillane quarternary amine antimicrobial to the treated filter foam;
    as air moves through the treated filter foam, removing a second set of contaminants.

2. The method of claim 1, wherein the treated filter fabric has an average pore size less than or equal to 120 microns.

3. The method of claim 1, wherein the treated filter foam has an average pores per square inch less than or equal to 100 pores per square inch.

4. The method of claim 1, wherein the binder further comprises urea and methyl acryloid.

5. The method of claim 1, wherein the ionizing agent is tourmaline.

6. The method of claim 1, wherein the filter includes a frame.

7. The method of claim 6, wherein the frame is recycled from an original equipment manufacturer filter.

8. The method of claim 1, wherein filtering the air with the treated filter fabric further comprises ionizing the air with the ionizing agent as the air passes through the treated filter fabric.

9. The method of claim 1, wherein filtering the air with the treated filter foam further comprises ionizing the air with the ionizing agent as the air passes through the treated filter foam.

10. The method of claim 1, wherein the filter is disposed around a hollow opening and the method further includes:
    directing air into the hollow opening;
    directing air from the hollow opening and through the treated filter fabric; and
    directing air from the treated filter fabric and through the treated filter foam.

11. The method of claim 1, wherein the filter is disposed around an open, cylindrical frame, wherein the method further includes:
    directing air into the open cylindrical frame, and
    directing the air from the open cylindrical frame radially outward through, first, the treated filter fabric, and then the treated filter foam.

12. The method of claim 1, wherein the treated filter fabric forms an inner annular filter structure around the frame and wherein the treated filter foam forms an outer annular filter structure around the inner annular filter structure.

13. A method of filtering air for use in a combustion engine, the method comprising:
- directing air through a filter, the filter comprising:
  - a frame;
  - a treated filter fabric disposed adjacent to the frame,
    - wherein the treated filter fabric includes an ionizing agent, an organo silane quarternary amine antimicrobial, and a binder comprising guar gum and ammonium sulfate, the binder binding the ionizing agent and the organo silane quarternary amine antimicrobial to the filter fabric; and
  - a treated filter foam disposed adjacent to the treated filter fabric,
    - wherein the treated filter foam includes an ionizing agent, an organo silane quarternary amine antimicrobial, and a binder comprising guar gum and ammonium sulfate, the binder binding the ionizing agent and the organo silane quarternary amine antimicrobial to the filter foam;
- filtering the air by removing impurities as the air passes through the filter.

\* \* \* \* \*